United States Patent
Caruso et al.

(10) Patent No.: US 10,071,532 B2
(45) Date of Patent: Sep. 11, 2018

(54) ROTOR BLADES HAVING THERMOPLASTIC COMPONENTS AND METHODS OF ASSEMBLING SAME

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 366 days.

(21) Appl. No.: 14/835,977

(22) Filed: Aug. 26, 2015

(65) Prior Publication Data

US 2017/0057158 A1    Mar. 2, 2017

(51) Int. Cl.
*B29D 99/00* (2010.01)
*F03D 80/00* (2016.01)
(Continued)

(52) U.S. Cl.
CPC ......... *B29D 99/0028* (2013.01); *F03D 80/00* (2016.05); *B29C 65/02* (2013.01); *B29C 65/48* (2013.01); *B29C 65/4815* (2013.01); *B29C 65/4835* (2013.01); *B29C 65/5057* (2013.01); *B29C 65/562* (2013.01); *B29C 66/1122* (2013.01); *B29C 66/524* (2013.01); *B29C 66/532* (2013.01); *B29C 66/543* (2013.01);
(Continued)

(58) Field of Classification Search
CPC . B29D 99/0028; F03D 80/00; B29C 65/4835; B29C 65/5057; B29C 65/562; B29C 66/7212; B29K 2309/08; B29K 2301/00; B29K 2309/02; B29K 2305/00
See application file for complete search history.

(56) References Cited

U.S. PATENT DOCUMENTS

| | | | |
|---|---|---|---|
| 6,264,877 B1 | 7/2001 | Pallu De La Barriere | |
| 8,317,479 B2 | 11/2012 | Vronsky et al. | |

(Continued)

FOREIGN PATENT DOCUMENTS

| | | |
|---|---|---|
| CN | 101906251 | 8/2010 |
| JP | 2007-92716 | 4/2007 |

(Continued)

OTHER PUBLICATIONS

Teuwen et al., Vacuum Infused Thermoplastic Composites for Wind Turbine Blades, 2008 Wind Turbine Blade Workshop—Sandia National Laboratories, Jun. 3, 2008, 22 pages.

*Primary Examiner* — Moshe Wilensky
(74) *Attorney, Agent, or Firm* — Dority & Manning, P.A.

(57) ABSTRACT

The present disclosure is directed to a method of assembling a modular rotor blade of a wind turbine. The method includes identifying a main blade structure, constructed at least in part, from at least one of a thermoset or a thermoplastic material. The method also includes identifying at least one blade segment, constructed at least in part, of a thermoplastic material reinforced with at least one of glass fibers or carbon fibers. Thus, the method also includes securing the at least one blade segment to the main blade structure, e.g. via welding.

14 Claims, 12 Drawing Sheets

(51) Int. Cl.
B29C 65/48 (2006.01)
B29C 65/50 (2006.01)
B29C 65/56 (2006.01)
B29C 65/00 (2006.01)
B29C 65/02 (2006.01)
B29L 31/08 (2006.01)

(52) U.S. Cl.
CPC .......... B29C 66/636 (2013.01); B29C 66/721 (2013.01); B29C 66/7212 (2013.01); B29C 66/7392 (2013.01); B29C 66/7394 (2013.01); B29C 66/73921 (2013.01); B29C 66/73941 (2013.01); B29L 2031/085 (2013.01); Y02P 70/523 (2015.11)

(56) References Cited

U.S. PATENT DOCUMENTS

| | | |
|---|---|---|
| 8,657,581 B2 | 2/2014 | Pilpel et al. |
| 8,673,106 B1 | 3/2014 | Jolley et al. |
| 8,747,098 B1 | 6/2014 | Johnson et al. |
| 8,961,142 B2 | 2/2015 | Wansink |
| 8,992,813 B2 | 3/2015 | Robbins et al. |
| 2009/0148300 A1 | 6/2009 | Driver et al. |
| 2009/0169390 A1* | 7/2009 | Nies .................. F03D 1/065 416/223 A |
| 2009/0242119 A1* | 10/2009 | Bech .................. B29C 66/1162 156/307.1 |
| 2011/0097211 A1 | 4/2011 | Rudling |
| 2013/0164133 A1 | 6/2013 | Grove-Nielsen |
| 2014/0295187 A1 | 10/2014 | Jacobsen et al. |

FOREIGN PATENT DOCUMENTS

| | | |
|---|---|---|
| WO | WO 2010/025830 A2 | 3/2010 |
| WO | WO 2011/088835 A2 | 7/2011 |
| WO | WO 2011/098785 A2 | 8/2011 |
| WO | WO 2015/015202 A1 | 2/2015 |

* cited by examiner

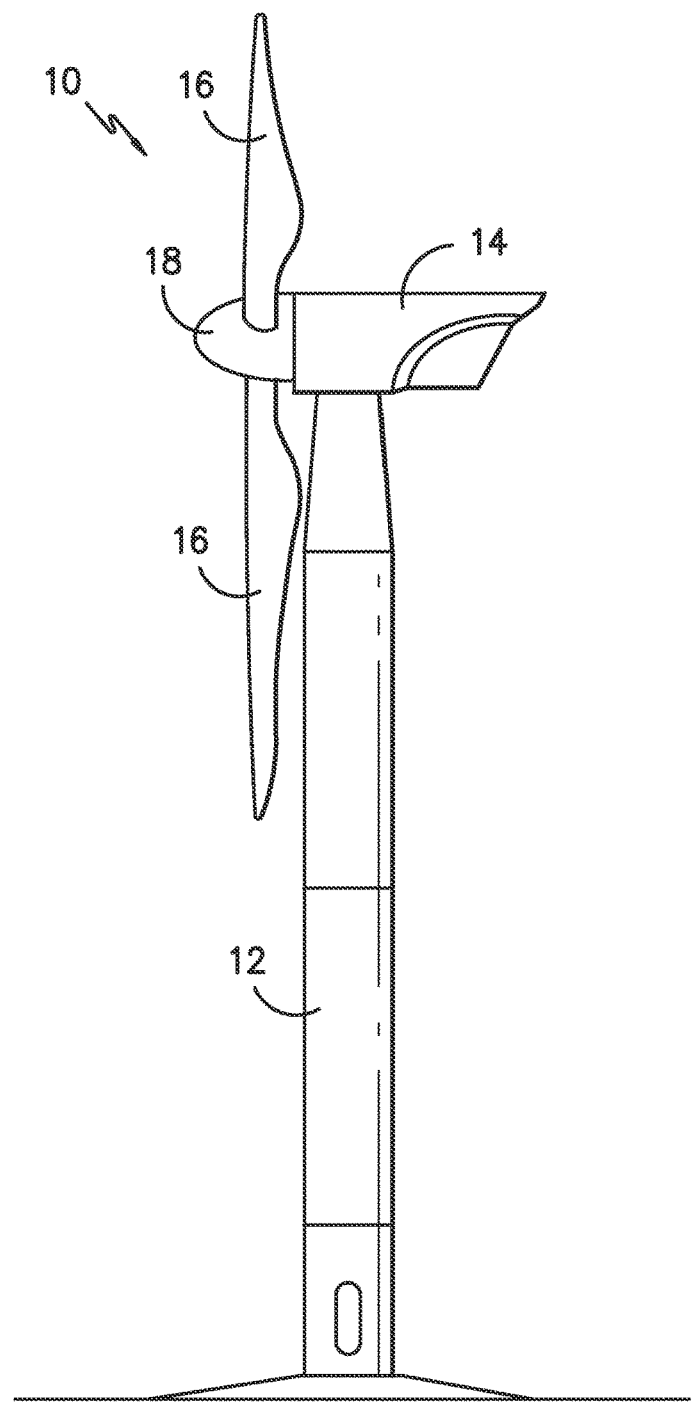
FIG. -1-

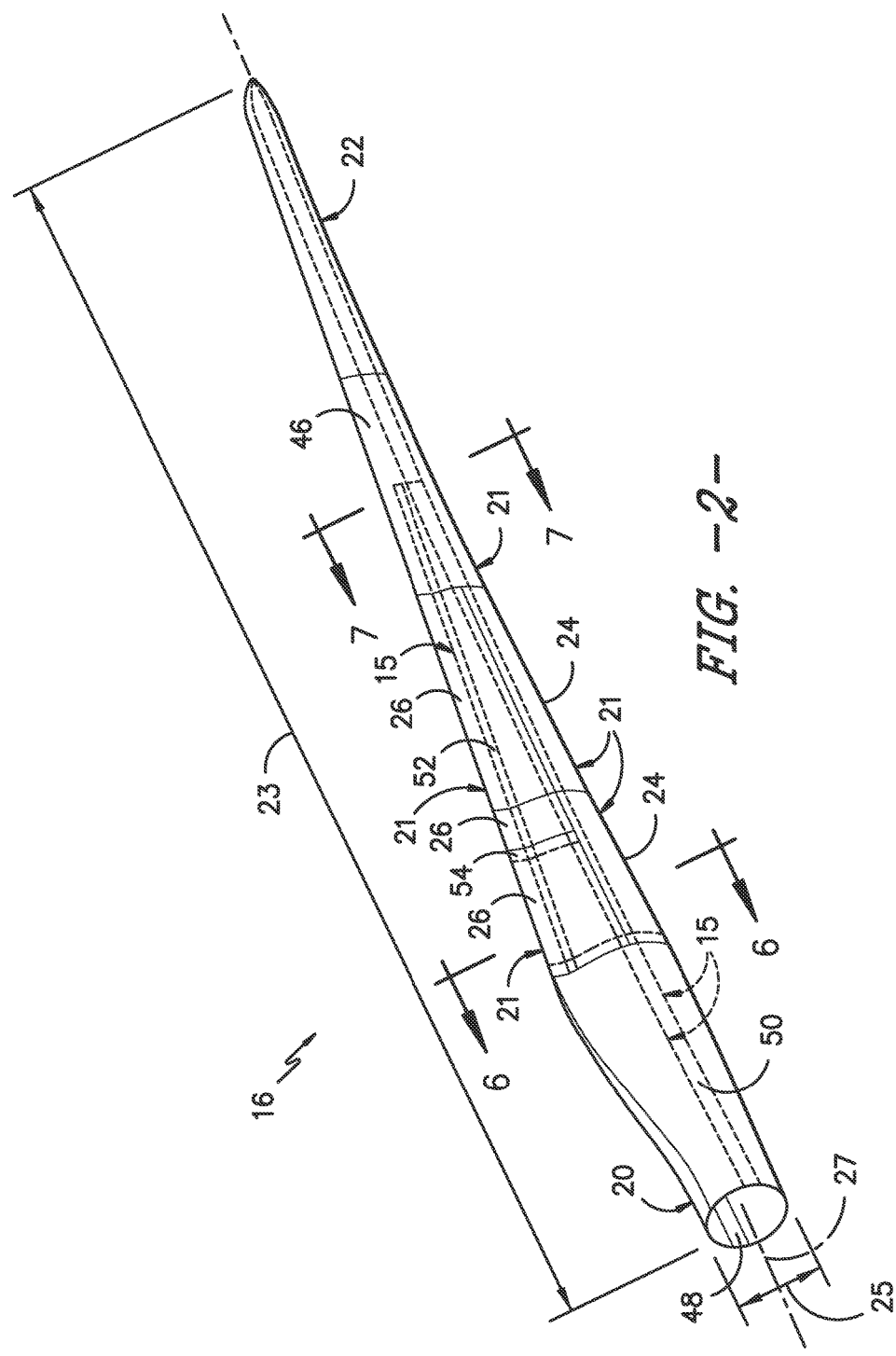
FIG. -2-

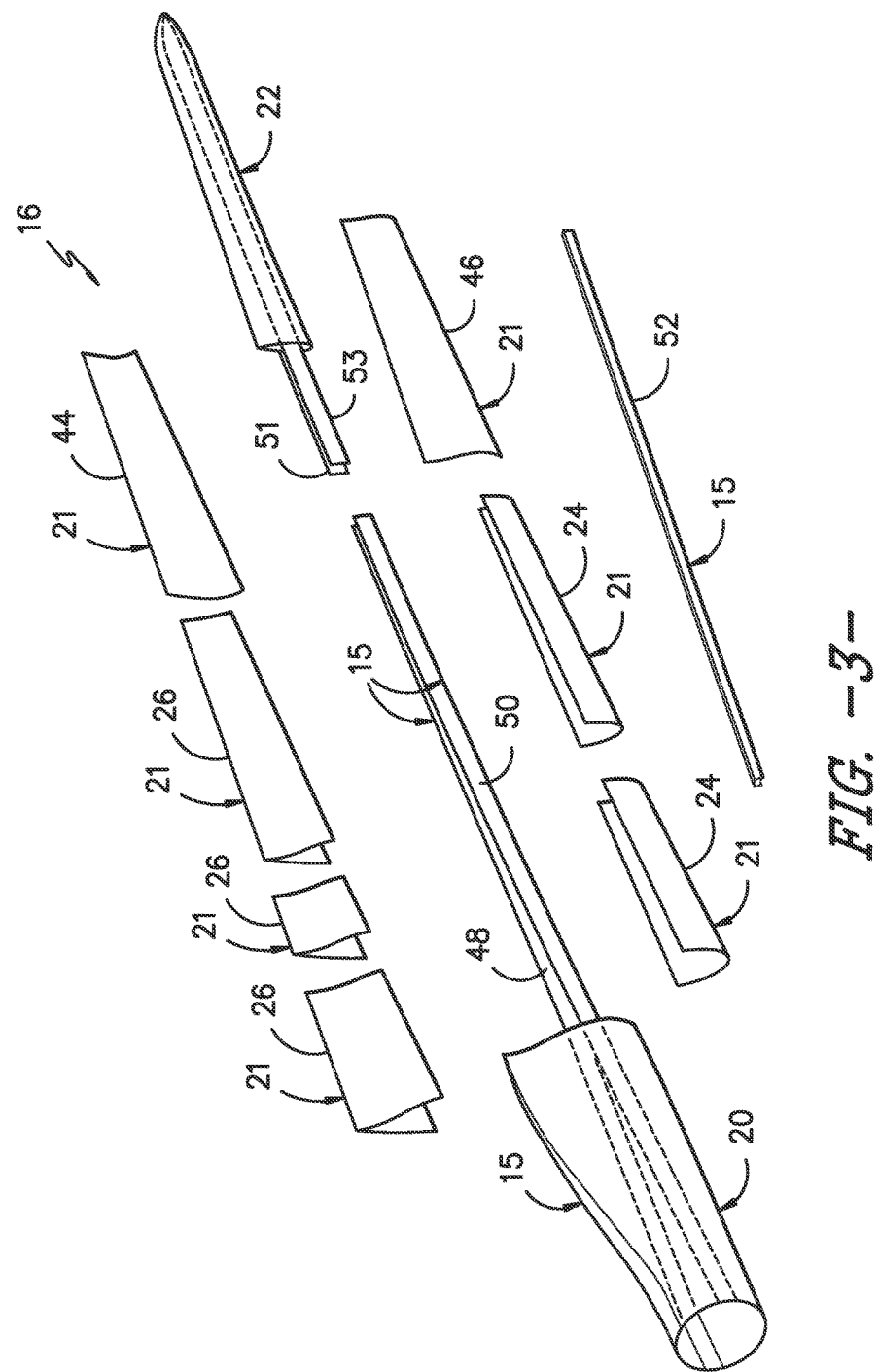
FIG. -3-

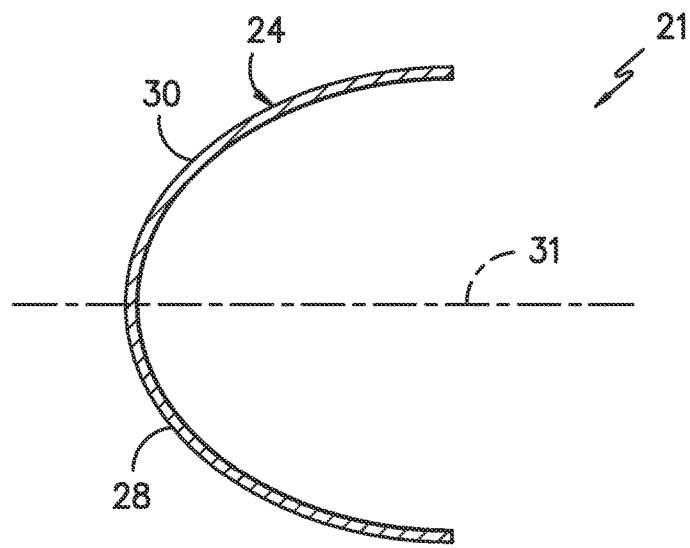
FIG. -4-
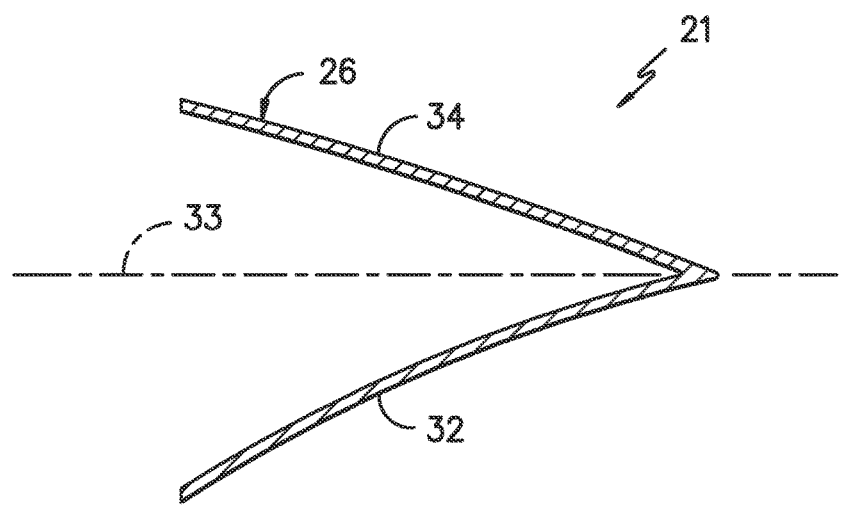
FIG. -5-

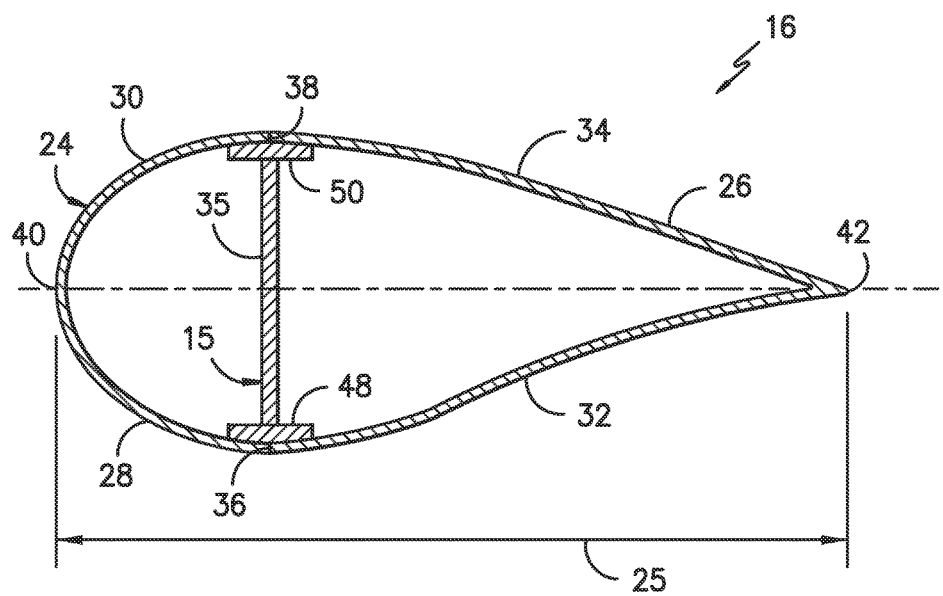
FIG. -6-
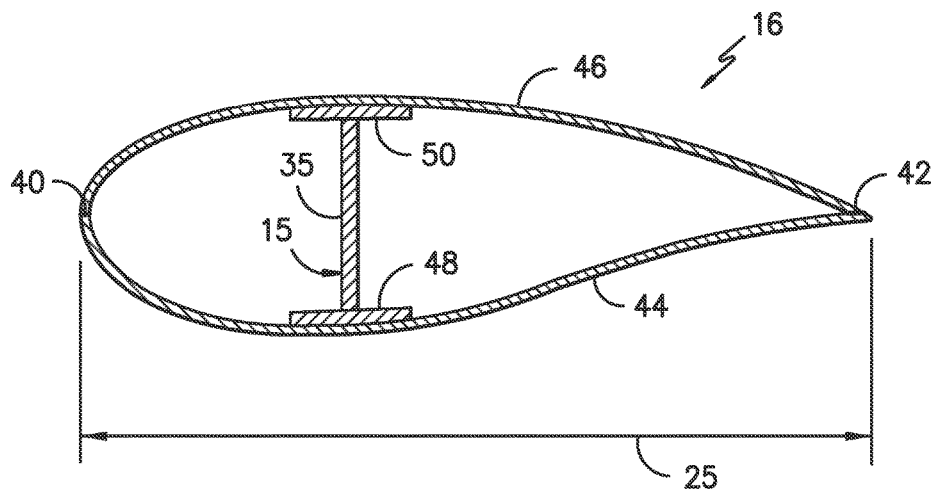
FIG. -7-

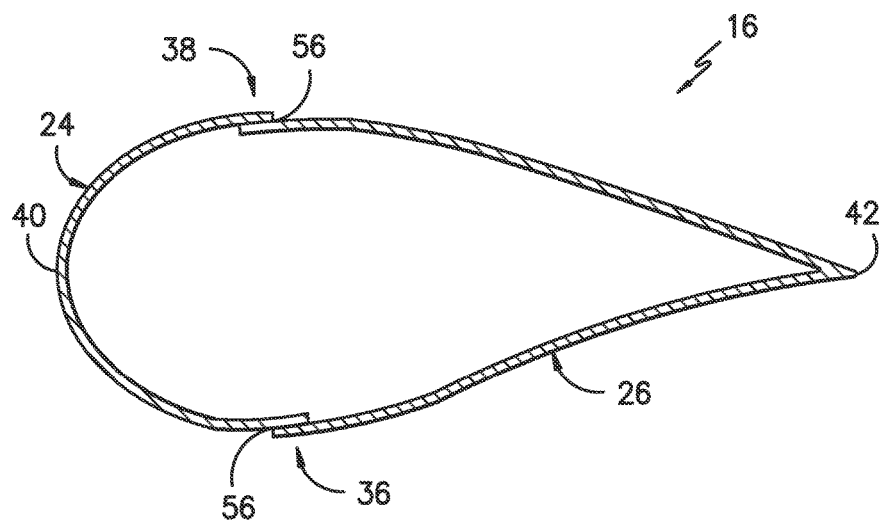
FIG. -8-
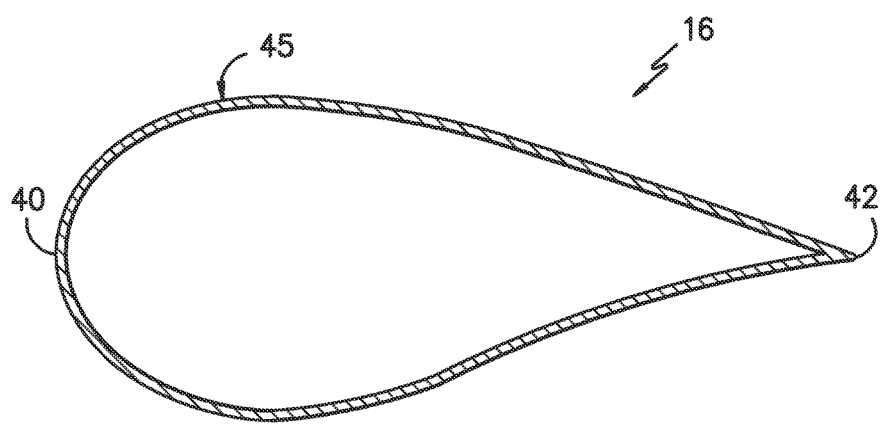
FIG. -9-

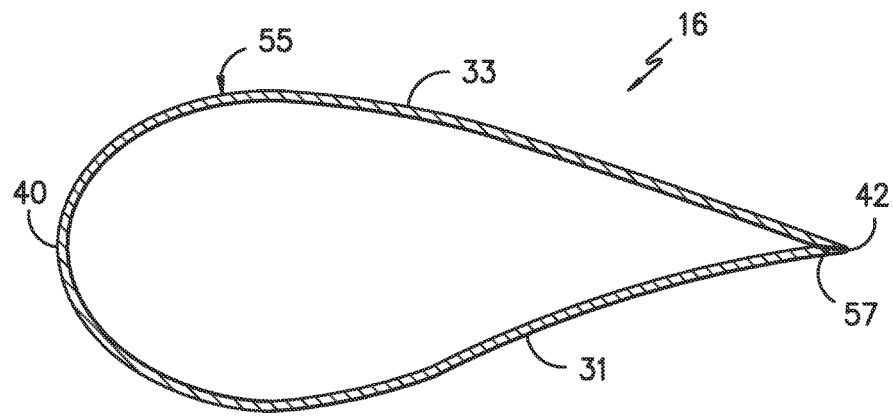
FIG. -10-
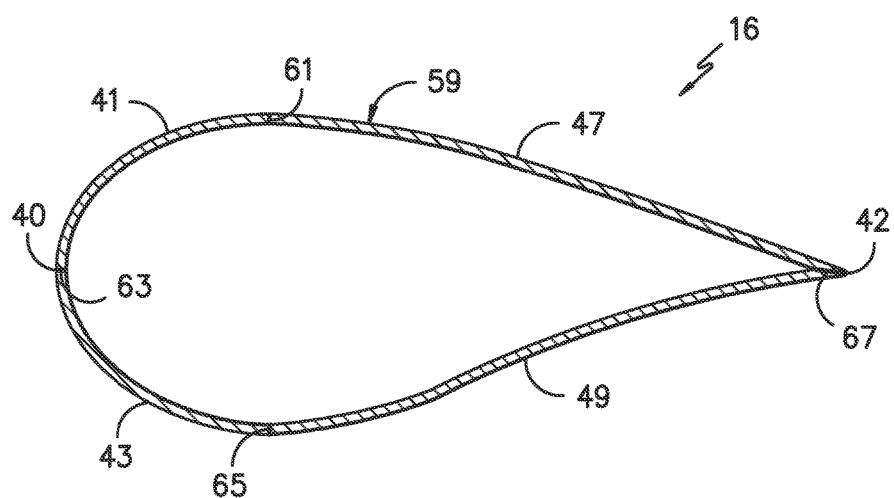
FIG. -11-

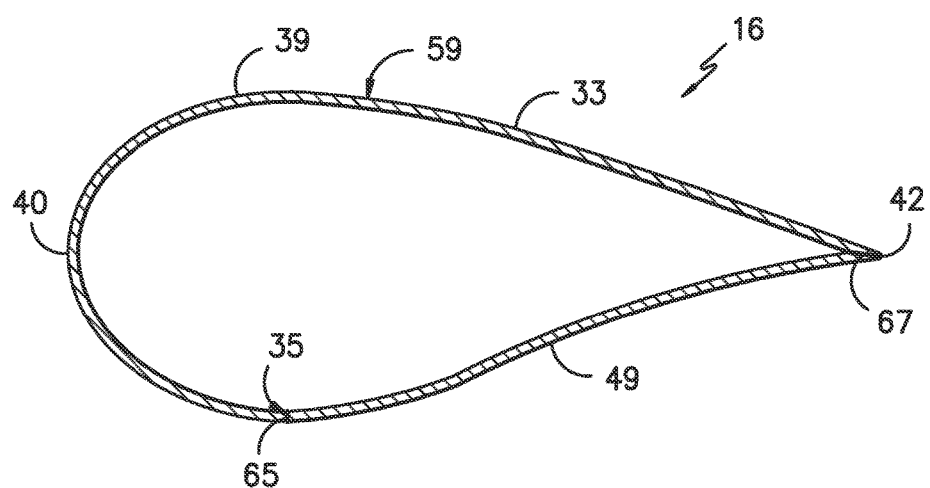
FIG. -12-

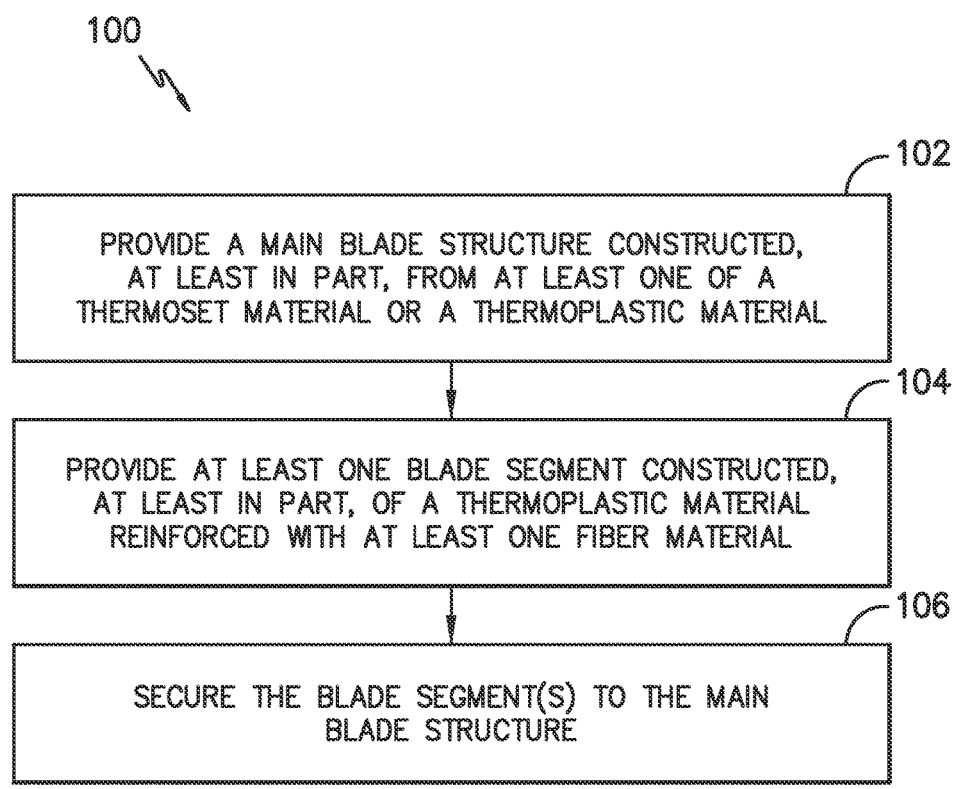
FIG. -13-

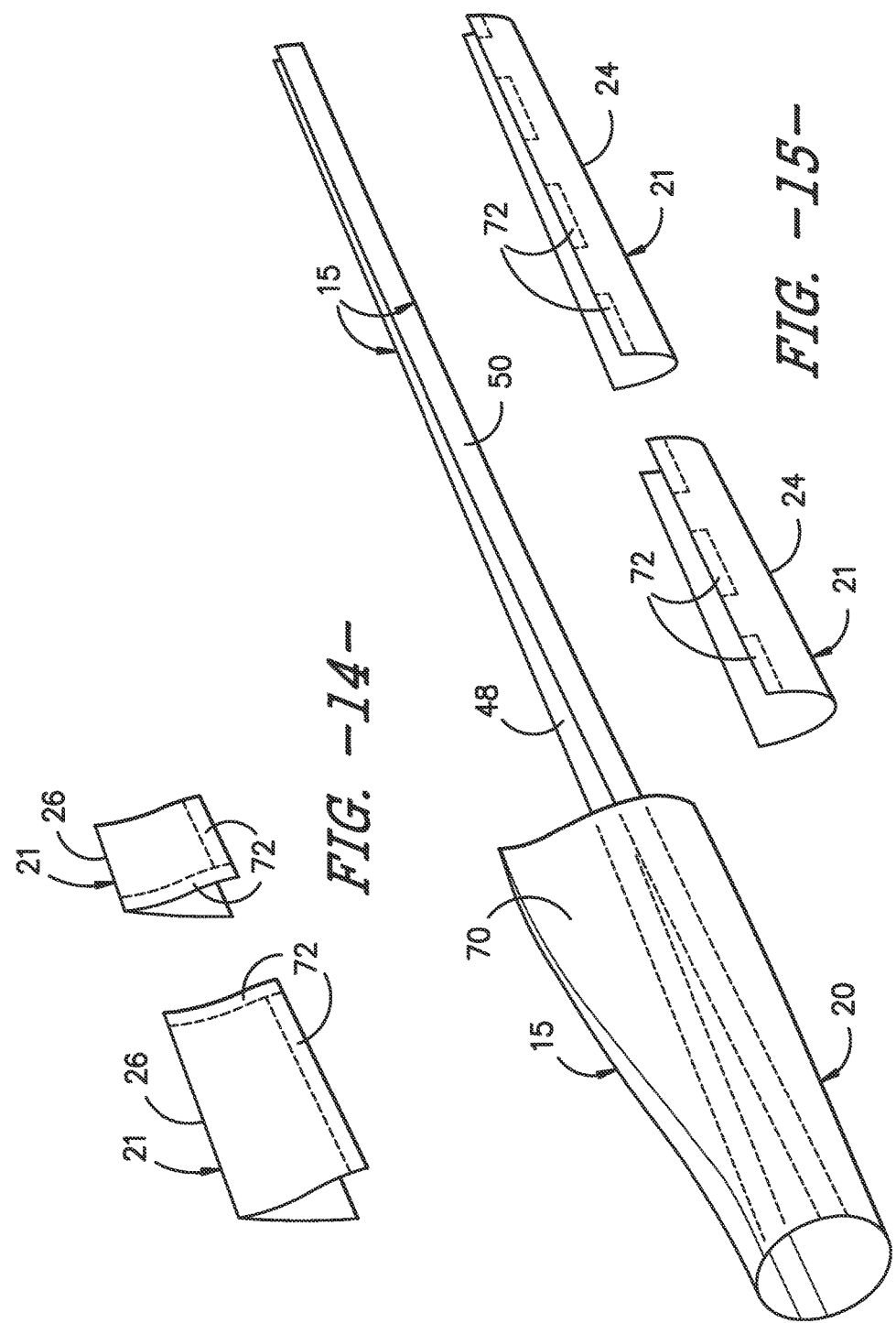

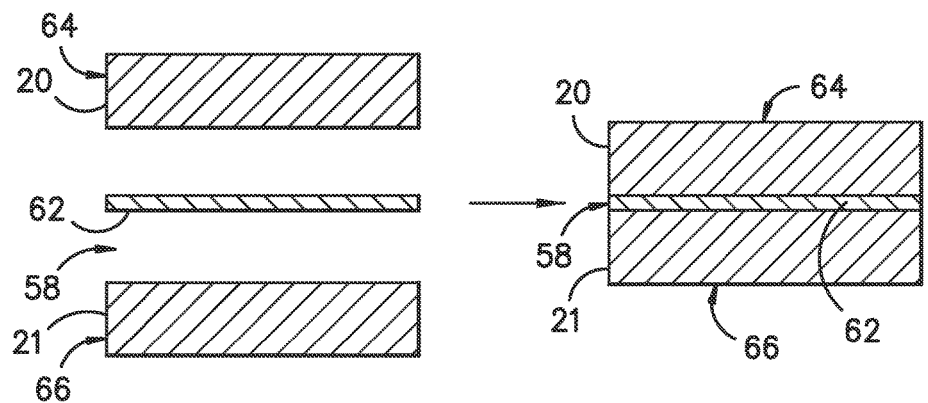
FIG. -16-
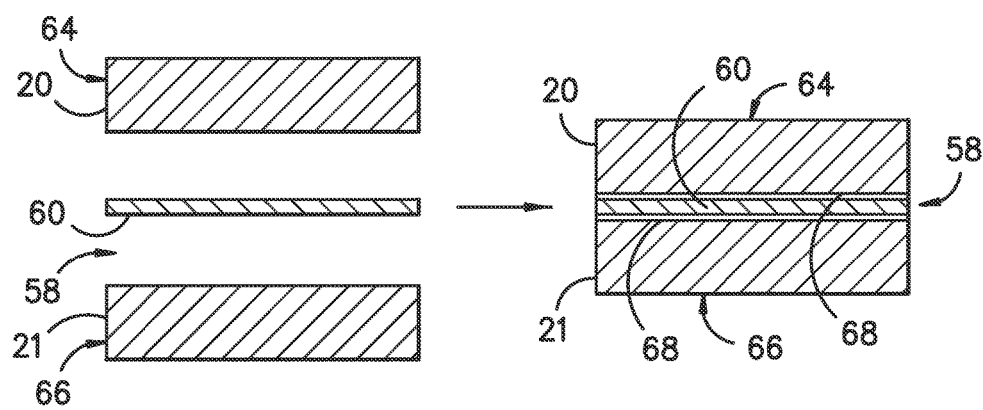
FIG. -17-

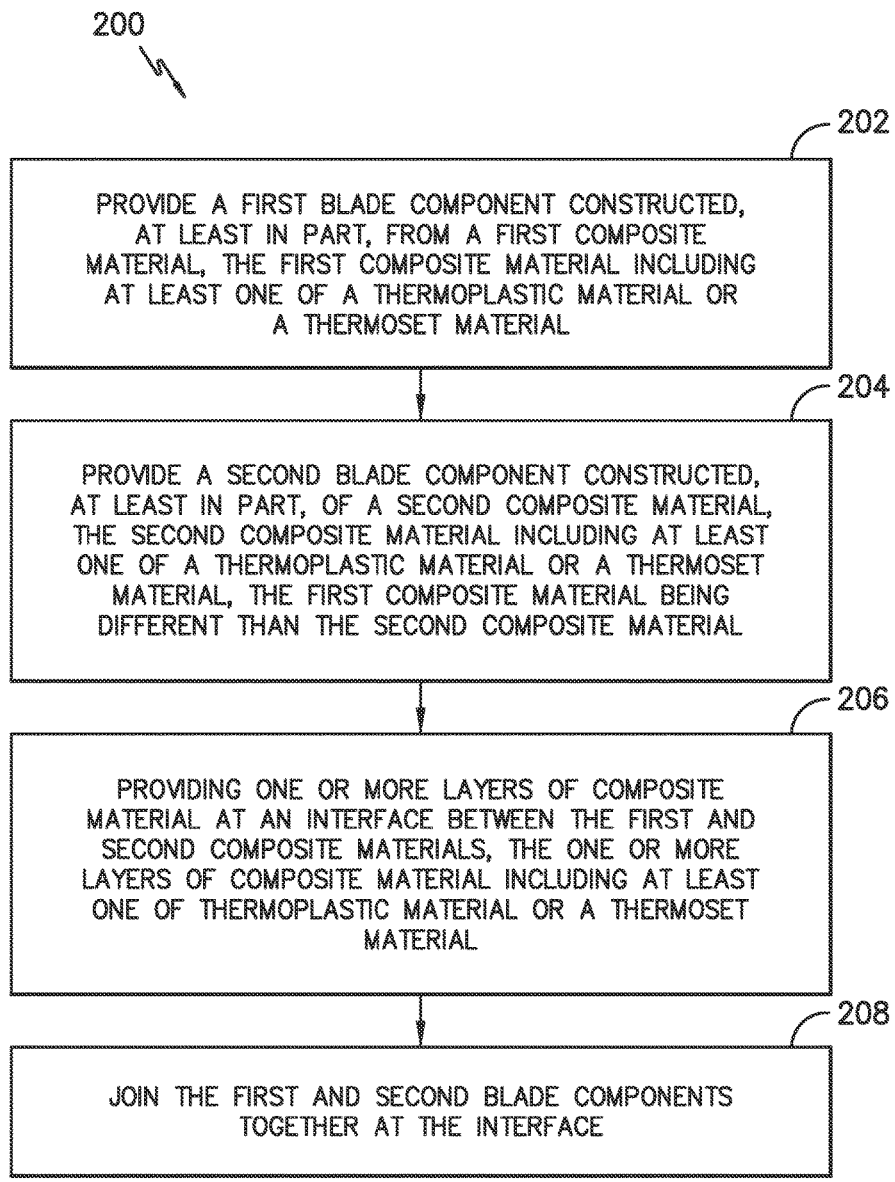
FIG. -18-

ROTOR BLADES HAVING THERMOPLASTIC COMPONENTS AND METHODS OF ASSEMBLING SAME

FIELD OF THE INVENTION

The present disclosure relates generally to wind turbine rotor blades, and more particularly to modular wind turbine rotor blades constructed of thermoset and/or thermoplastic materials and methods of assembling same.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together with a thermoset resin.

Such rotor blades, however, are not without issues. For example, the bond lines of typical rotor blades are generally formed by applying a suitable bonding paste or compound along the bond line with a minimum designed bond width between the shell members. These bonding lines are a critical design constraint of the blades as a significant number of turbine blade field failures occur at the bond-line. Separation of the bond line along the leading and/or trailing edges of an operational turbine blade can result in a catastrophic failure and damage to the wind turbine.

In addition, the methods used to manufacture the rotor blades and/or structural components thereof can be difficult to control, defect prone, and/or highly labor intensive due to handling of the dry fabrics and the challenges of infusing large laminated structures. Moreover, as rotor blades continue to increase in size, conventional manufacturing methods continue to increase in complexity as the blade halves are typically manufactured using opposing mold halves that must be large enough to accommodate the entire length of the rotor blade. As such, joining the large blade halves can be highly labor intensive and more susceptible to defects.

One known strategy for reducing the complexity and costs associated with pre-forming, transporting, and erecting wind turbines having rotor blades of increasing sizes is to manufacture the rotor blades in blade segments. The blade segments may then be assembled to form the rotor blade. However, known joint designs for connecting the thermoset blade segments together typically have a variety of disadvantages. For example, many known joint designs require complex interconnecting components and do not provide for sufficient alignment of the blade segments, thereby increasing the amount of time needed to assemble the blade segments. In addition, segmented blades are typically heavier than conventional blades due to the additional joints and/or related parts.

Thus, the art is continuously seeking new and improved modular rotor blades and related assembly methods that address the aforementioned issues. Accordingly, the present disclosure is directed to improved modular wind turbine rotor blades constructed of thermoset and/or thermoplastic materials and methods of assembling same.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method of assembling a modular rotor blade of a wind turbine. The method includes identifying a main blade structure, constructed at least in part, from at least one of a thermoset material or a thermoplastic material. The method also includes identifying at least one blade segment, constructed at least in part, of a thermoplastic material reinforced with at least one of fiber material. More specifically, in one embodiment, the fiber material may include glass fibers, carbon fibers, polymer fibers, ceramic fibers, nanofibers, metal fibers, or similar. The method also includes securing the at least one blade segment to the main blade structure.

For example, in one embodiment, the step of securing the at least one blade segment to the main blade structure may include providing one or more thermoplastic layers at an interface between the main blade structure and the at least one blade segment and welding the at least one blade segment to the main blade structure at the interface. Alternatively, the step of securing the at least one blade segment to the main blade structure may include providing one or more thermoset layers at an interface between the thermoset material and the thermoplastic material, and bonding the at least one blade segment to the main blade structure at the interface. More specifically, in certain embodiments, the step of bonding the blade segment(s) to the main blade structure at the interface may include joining the blade segment(s) to the main blade structure via an adhesive, one or more mechanical fasteners, or similar.

In another embodiment, the method may further include securing a plurality of blade segments to the main blade structure and joining adjacent blade segments together via welding. In further embodiments, the method may also include providing at least one of an adhesive or a resin between the blade segment(s) and the main blade structure before welding the blade segment(s) to the main blade structure at the interface.

In additional embodiments, the method may also include pre-forming the main blade structure with the one or more thermoplastic layers. More specifically, in certain embodiments, the step of pre-forming the main blade structure with the one or more thermoplastic layers may include co-curing the thermoplastic layer(s) with the thermoset main blade structure, co-infusing the thermoplastic layer(s) with the thermoset main blade structure, mechanically fastening the thermoplastic layer(s) layers onto the thermoset main blade structure, or bonding the one or more thermoplastic layers onto the thermoset main blade structure via an adhesive and/or a resin.

In yet another embodiment, the main blade structure may include any one of or a combination of the following: a pre-formed blade root section, a pre-formed blade tip section, one or more one or more continuous spar caps, one or more shear webs, an additional structural component secured to the blade root section and configured within the at least one blade segment, or any other suitable structural component of the rotor blade. Thus, in certain embodiments, the method may further include pre-forming the blade root section by joining a plurality of root portions of the blade root section (e.g. a first root half and a second root half) together, e.g. via welding. As such, if both root portions are constructed of a thermoplastic material, the root portions can be easily welded together. In additional embodiments, the main blade structure may also include the blade root section and the one or more continuous spar caps infused therewith. Thus, in such embodiments, the method may include securing (i.e. by infusing or welding) the continuous spar cap(s) to the blade root section such that the one or more continuous spar caps extending in a generally span-wise direction and within the at least one blade segment.

In further embodiments, the step of securing the blade segment(s) to the main blade structure may include securing the blade segment(s) to the continuous spar cap(s). In additional embodiments, the method may further include securing the continuous spar cap(s) to the blade root section before securing the blade segment(s) to the continuous spar cap(s). Alternatively, the method may include securing the blade segment(s) to the continuous spar cap(s) before securing or infusing the continuous spar cap(s) to the blade root section.

In still another embodiment, the method may also include closing out the blade root section with one or more shear webs.

In another aspect, the present disclosure is directed to a method of assembling a modular rotor blade of a wind turbine. The method includes identifying a first blade component, constructed at least in part, from a first composite material. The first composite material includes at least one of a thermoset material or a thermoplastic material. The method also includes identifying a second blade component, constructed at least in part, from a second composite material. The second composite material includes at least one of a thermoset material or a thermoplastic material. Further, the first composite material is different than the second composite material. The method also includes providing one or more layers of composite material at an interface between the first and second blade components. In addition, the one or more layers of composite material include at least one of a thermoset material or a thermoplastic material. Thus, the method also includes joining the at least one blade segment to the main blade structure at the interface.

In one embodiment, the first and second blade components may include any suitable blade component, including but not limited to a blade root section, a blade tip section, one or more spar caps, one or more shear webs, or one or more blade segments. In addition, the method may include pre-forming the first and/or second blade components with the one or more layers of composite material. More specifically, the step of pre-forming the first or second blade components with the one or more layers of composite material may include co-curing the one or more layers with the first or second blade components, co-infusing the one or more layers with the first or second blade components, mechanically fastening the one or more layers onto the first or second blade components, bonding the one or more layers onto the first or second blade components via an adhesive, or similar.

In yet another aspect, the present disclosure is directed to a method of assembling a modular rotor blade of a wind turbine. The method includes identifying a main blade structure constructed, at least in part, of a thermoplastic material reinforced with at least one fiber material. The fiber material includes at least one of glass fibers, carbon fibers, polymer fibers, ceramic fibers, nanofibers, metal fibers, or similar. Further, the method includes identifying at least one blade segment configured with the main blade structure, wherein the at least one blade segment is constructed, at least in part, from at least one of a thermoset material or a thermoplastic material. In addition, the method includes joining the at least one blade segment to the main blade structure at the interface.

In one embodiment, the step of joining the blade segment(s) to the main blade structure at the interface may further include welding the blade segment(s) to the main blade structure at the interface. Alternatively, the step of joining the blade segment(s) to the main blade structure at the interface may include bonding the blade segment(s) to the main blade structure at the interface via an adhesive, one or more mechanical fasteners, or similar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a modular rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 according to the present disclosure along line 6-6;

FIG. 7 illustrates a cross-sectional view of the modular rotor blade of FIG. 2 according to the present disclosure along line 7-7;

FIG. 8 illustrates a cross-sectional view of another embodiment of a modular rotor blade according to the present disclosure, particularly illustrating a blade segment having overlapping pressure and suction side seams;

FIG. 9 illustrates a cross-sectional view of another embodiment of a modular rotor blade according to the present disclosure, particularly illustrating a non-jointed, continuous blade segment;

FIG. 10 illustrates a cross-sectional view of another embodiment of a modular rotor blade according to the present disclosure, particularly illustrating a single-jointed blade segment;

FIG. 11 illustrates a cross-sectional view of another embodiment of a modular rotor blade according to the present disclosure, particularly illustrating a plurality of blade segments joined together via multiple joints;

FIG. 12 illustrates a cross-sectional view of another embodiment of a modular rotor blade according to the present disclosure, particularly illustrating a plurality of blade segments joined together via multiple joints;

FIG. 13 illustrates a flow diagram of one embodiment of a method for assembling a modular rotor blade according to the present disclosure;

FIG. 14 illustrates a plurality of blade segments according to the present disclosure;

FIG. 15 illustrates a plurality of blade segments and a blade root section unassembled according to the present disclosure, particularly illustrating blade segments constructed, at least in part, of a thermoplastic material;

FIG. 16 illustrates a simplified diagram of one embodiment of first and second blade components being assembled according to the present disclosure;

FIG. 17 illustrates a simplified diagram of another embodiment of first and second blade components being assembled according to the present disclosure; and FIG. 18 illustrates a flow diagram of another embodiment of a method for assembling a modular rotor blade according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a modular rotor blade for a wind turbine and methods of assembling same. More specifically, the various components of the modular rotor blade may be constructed of varying materials to tailor the components to obtain desired performance characteristics. In addition, the resin system may be tailored during the manufacturing process to provide improved bonding between the rotor blade components. For example, the rotor blade may be constructed of a combination of thermoset and/or thermoplastic materials. Thus, in certain embodiments, the rotor blade may include a pre-formed main blade structure constructed, at least in part, from a thermoset material and at least one blade segment configured with the main blade structure and constructed, at least in part, of a thermoplastic material or vice versa. Further, the thermoplastic material and/or the thermoset material as described herein may be reinforced with a fiber material, including but not limited to glass fibers, carbon fibers, polymer fibers, ceramic fibers, nanofibers, metal fibers, or combinations thereof. In addition, the direction of the fibers may include biaxial, unidirectional, triaxial, or any other another suitable direction and/or combinations thereof.

Typically, a thermoset material and a fiber-reinforced thermoplastic component would have to be bonded (e.g. with an adhesive) or mechanically fastened. The present disclosure, however, provides an improved connection at the thermoset-to-thermoplastic interface. For example, in certain embodiments, one or more additional layers of composite material (e.g. thermoplastic or thermoset layers) are applied at the interface such that the connection can be welded instead of bonded. It should be understood that similar connections may be made for any of the additional rotor blade components as well.

Thus, the present disclosure provides many advantages not present in the prior art. For example, the present disclosure provides a modular rotor blade constructed of multiple resins that can be tailored by component to obtain desired performance characteristics. In addition, the resin systems of the rotor blades can be tailored to simplify the manufacturing process. Thus, the modular rotor blades as described herein may reduce costs, labor time, and/or assembly cycle time of conventional rotor blade production. Accordingly, the rotor blades and methods of assembling same of the present disclosure provide an economic alternative to conventional rotor blades. Further, the rotor blades of the present disclosure can have a reduced weight by eliminating many of the complex joints of conventional blades.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Referring now to FIGS. 2 and 3, various views of a modular rotor blade 16 according to the present disclosure are illustrated. As shown, the rotor blade 16 includes a main blade structure 15 constructed, at least in part, from a thermoset or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset or a thermoplastic material. In addition, as mentioned, the thermoplastic and/or the thermoset material as described herein may optionally be reinforced with a fiber material, including but not limited to glass fibers, carbon fibers, polymer fibers, ceramic fibers, nanofibers, metal fibers, or similar or combinations thereof. In addition, the direction of the fibers may include biaxial, unidirectional, triaxial, or any other another suitable direction and/or combinations thereof. Further, the fiber content may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 40 of the rotor blade 16 and a trailing edge 42 of the rotor blade 16. As is generally understood, the chord 25 may generally vary in length with respect to the span 23 as the rotor blade 16 extends from the blade root section 20 to the blade tip section 22.

In specific embodiments, as shown in FIGS. 2-3 and 6-7, the main blade structure 15 may include the blade root section 20 with one or more longitudinally extending spar caps 48, 50 infused therewith. For example, the blade root section 20 52 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety. Similarly, the main blade structure 15 may include the blade tip section 22 with one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In alternative embodiments, the continuous spar cap(s) 48, 50, 51, 53 may be joined or pre-formed with the blade segment(s) 21, e.g. before being joined to the blade root section 20 and/or the blade tip section 22. In such embodiments, the blade segment(s) 21 may be secured to the spar caps 48, 50, 51, 53 via welding, an adhesive, or one or more mechanical fasteners, e.g. depending on the materials of the spar cap(s) 48, 50, 51, 53 and the blade segment(s) 21 which will be discussed in more detail below.

In addition, the spar caps 48, 50, 51, 53 may be constructed of any suitable materials, e.g. a thermoplastic or thermoset material or combinations thereof. For example, in certain embodiments, one or more of the spar caps 48, 50, 51, 53 may be constructed of a low-cost resin material, e.g. a thermoset polymer, reinforced with one or more fiber materials. In such an embodiment, a thermoplastic resin (also optionally reinforced with a fiber material) may be infused around at least a portion of the already-cured thermoset spar caps. Thus, the thermoplastic resin system is configured to coat the spar cap so as to allow subsequent welding procedures to take place during assembly of the rotor blade 16 (e.g. to allow the thermoplastic blade segments 21 to be welded to one or more of the spar caps 48, 50, 51, 53). Further, the thermoplastic resin may encapsulate the entire spar cap or only certain regions of the spar cap to allow subsequent welding with other blade components. Moreover, such regions may be broken up by span or chord-wise directions and do not necessarily have to be continuous. In still additional embodiments, the spar caps 48, 50, 51, 53 may be constructed entirely of a thermoplastic material or entirely of a thermoset material.

In addition, in certain embodiments, the spar caps 48, 50, 51, 53 may be pultruded from thermoplastic or thermoset materials. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

In addition, as shown in FIGS. 6-7, the main blade structure 15 may include one or more shear webs 35 configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20. In addition, as shown in FIGS. 2 and 3, the main blade structure 15 may also include an additional structural component 52 secured to the blade root section 20 and extending in a generally span-wise direction. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 24, 26 can be mounted thereto.

The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Referring particularly to FIGS. 2-12, any number of blade segments 21 having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade segments 21 may be constructed of any suitable materials, including but not limited to a thermoset material or a thermoplastic material optionally reinforced with one or more fiber materials. More specifically, as generally shown in the figures, the blade segments 21 may include any one of or combination of the following blade segments: pressure and/or suction side segments 44, 46, (FIG. 7), leading and/or trailing edge segments 24, 26 (FIGS. 4-6 and 8), a non-jointed segment 45 (FIG. 9), a single-jointed segment 55 (FIG. 10), a multi-jointed blade segment (FIG. 11), a J-shaped blade segment 59 (FIG. 12), or similar.

More specifically, as shown in FIG. 4, the leading edge segments 24 may have a forward pressure side surface 28 and a forward suction side surface 30. Similarly, as shown in FIG. 5, each of the trailing edge segments 26 may have an aft pressure side surface 32 and an aft suction side surface 34. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16. In addition, as particularly shown in FIGS. 6 and 8, the leading edge segment(s) 26 and the trailing edge segment(s) 26 may be joined at a pressure side seam 36 and a suction side seam 38. For example, as shown particularly in FIG. 8, the blade segments 24, 26 may be configured to overlap at the pressure side seam 36 and/or the suction side seam 38. Further, as shown in FIG. 2, adjacent blade segments 24, 26 may be configured to overlap at a seam 54. Thus, where the blade segments are constructed of a thermoplastic material, adjacent blade segments 21 can be welded together along the seams 36, 38, 54. Alternatively, in certain embodiments, the various segments of the rotor blade 16 may be secured together via an adhesive 56 (or mechanical fasteners) configured between the overlapping leading and trailing edge segments 24, 26 and/or the overlapping adjacent leading or trailing edge segments 24, 26.

As shown in FIG. 9, the rotor blade 16 may also include a non-jointed, continuous blade surface 45, e.g. constructed at least in part of a thermoplastic material. Thus, as shown, the non-jointed, continuous blade surface 45 does not require bonding of multiple chord-wise segments. Alternatively, as shown in FIG. 10, the rotor blade 16 may also include a blade segment having a single-jointed blade surface 55. More specifically, as shown, the single-jointed blade surface 55 may include a pressure side surface 33, a suction side surface 31, and a single joint 57 at the trailing edge 42. Thus, the single-jointed blade surface 55 only requires one joint instead of multiple joints. Such blade segment(s) 21 can be easily mounted to the main blade structure 15, e.g. by separating the pressure and suction side surfaces 31, 33 at the single joint 57, mounting the continuous blade segment 55 over the one or more spar caps 48, 50, and securing the continuous blade segment 55 to the one or more spar caps 48, 58 between the blade root section 20 and the blade tip section 22, e.g. by welding the pressure and suction side surfaces 31, 33 at the single joint 57 and welding the blade segment 55 to the one or more spar caps 48, 50.

Moreover, as shown in FIGS. 11 and 12, the rotor blade 16 may also include a multi-jointed blade surface 59. More specifically, as shown in FIG. 11, the multi-jointed blade surface 59 may include a plurality of segments 41, 43, 47, 49 joined together via multiple joints 61, 63, 65, 67 spaced about the cross-section of the blade segment 59. For example, as shown, the segments 41, 43, 47, 49 may include a forward pressure side segment 43, a forward suction side segment 41, an aft pressure side segment 49, and an aft suction side segment 47. In another embodiment, as shown in FIG. 12, the blade segment 59 may include a generally J-shaped blade segment 39 and an additional blade segment, e.g. aft pressure side segment 49 or aft suction side segment 47, joined together via joints 65 and 67. More specifically, as shown, the J-shaped blade segment 39 may extend from the trailing edge 42 around the suction side surface 33 to a pressure side seam 35. In certain embodiments, such multi-jointed blade segments may be joined together, e.g. via welding, when the blade segments are constructed, at least in part, of a thermoplastic material.

Referring now to FIGS. 13-18, various embodiments of assembling the modular rotor blade 16 as described herein are illustrated. For example, as shown in FIG. 13, a flow diagram of one embodiment of a method 100 for assembling a modular rotor blade 16 according to the present disclosure is illustrated. As shown at 102, the method 100 includes identifying a main blade structure 15 constructed, at least in part, from a thermoset material, e.g. as shown in FIG. 15. For example, as mentioned, the main blade structure 15 may include the blade root section 20, the blade tip section 22, one or more of the spar caps 48, 50, 51, 53, one or more shear webs 35, the structural component 52, and/or any other suitable structural component of the rotor blade 16. More specifically, as generally shown in the figures, the main blade structure 15 may include the blade root section 20 and/or the blade tip section 22 having one or more spar caps 48, 50, 51, 53 infused therewith and extending in a generally span-wise direction. In such an embodiment, as shown in FIG. 15, the blade root section 20 and the spar caps 48, 50 may be manufactured (e.g. infused) in a single shot or mold so as to produce a uniform, integral part. Similarly, the blade tip section 22 and the one or more spar caps 51, 53 may be in a single shot so as to produce a uniform, integral part.

As shown at 104, the method 100 also includes identifying at least one blade segment 21, constructed at least in part, of a thermoplastic material 72, e.g. as shown in FIGS. 14 and 15. For example, in certain embodiments, the blade segment(s) 21 may be constructed entirely of a thermoplastic material or may include localized regions 72 or layers of thermoplastic material (as shown). More specifically, as shown, the localized regions 72 of thermoplastic material may be located at or near the side edges of the blade segment(s) such that the segment(s) can be easily welded to each other as well as to the main blade structure 15. For example, as shown in FIG. 14, the side edges of the blade segment(s) 21 include a continuous strip 72 of thermoplastic material such that the edges may be easily welded. Further, as shown in FIG. 15, the side edges of the blade segment(s) 21 may include spaced apart strips 72 of thermoplastic material. Such blade segment(s) can be easily welded at the locations of the strips. In still further embodiments, the various blade components described herein may include localized regions or layers of thermoplastic material at any suitable location on the component. Thus, at shown at 106, the method 100 may further include securing the blade segment(s) 21 to the main blade structure 15, e.g. at the regions 72 of the thermoplastic material.

In addition, in certain embodiments, the blade segment(s) 21 or any other thermoplastic or thermoset blade component as described herein may be reinforced with at least one of fiber material, e.g. glass fibers, carbon fibers, polymer fibers, ceramic fibers, nanofibers, metal fibers, or similar. In certain embodiments, the direction of the fibers may include biaxial, unidirectional, triaxial, or any other another suitable direction and/or combinations thereof. Further, the fiber content (i.e. the type of fiber material) may vary depending on the stiffness required in the corresponding blade component, the region and/or the location of the blade component in the rotor blade 16 when assembled, and/or the desired weldability of the component. For example, in the weldable regions of FIGS. 14 and 15 (i.e. near the side edges of the blade segment(s), the fiber material may be omitted.

In additional embodiments, as shown in FIG. 16, the method 100 may also include providing one or more additional layers of composite material, e.g. one or more thermoplastic layers 60, at an interface 58 between the main blade structure 15 and the blade segment 21 to improve welding capabilities of the components. As such, in certain embodiments, the layers of composite material 60 are configured to change the functional groups of the thermoset-to-thermoplastic interface so as to assist with joining the components together. Thus, in particular embodiments, the method 100 may include welding the blade segment(s) 21 to the main blade structure 15 at the interface 58. Alternatively, as shown in FIG. 17, the step of securing the blade segment(s) 21 to the main blade structure 15 may include providing one or more thermoset layers 60 at an interface 58 between the blade segment(s) 21 to the main blade structure 15. Thus, the method 100 may further include bonding the blade segment(s) 21 to the main blade structure 15 at the interface 58. More specifically, as shown in FIG. 15, the step of bonding the blade segment(s) 21 to the main blade structure 15 at the interface 58 may include joining the blade segment(s) 21 to the main blade structure 15 via an adhesive 68, one or more mechanical fasteners (not shown), or similar. In further embodiments, the one or more thermoset layers 60 may be reinforced, for example, with one or more of the fiber materials as described herein.

In another embodiment, as shown in FIG. 15, the method 100 may further include joining adjacent blade segments 21 together via welding, e.g. when the blade segments 21 are constructed, at least in part, of a thermoplastic material. For example, as shown, the blade segment(s) 21 may include one or more areas of thermoplastic material 72 (e.g. around the side edges) such that adjacent blade segments can be easily welded together. In further embodiments, the method 100 may optionally include providing an additional adhesive and/or a resin between the blade segment(s) 21 and/or the main blade structure 15 before welding the blade segment(s) 21 to the main blade structure 15 at the interface 58 to improve the connection quality.

In additional embodiments, the method 100 may also include pre-forming the main blade structure 15 with the layer(s) of composite material, e.g. thermoplastic layers and/or thermoset layers. More specifically, in certain embodiments, the step of pre-forming the main blade structure 15 with the layer(s) of composite material may include co-curing the layer(s) with the main blade structure 15, co-infusing the layer(s) with the main blade structure 15, mechanically fastening the layer(s) onto the main blade structure 15, or bonding the layer(s) onto the main blade structure 15 via an adhesive or a resin. Thus, various blade components (e.g. the blade segments 21) can be easily welded to main blade structure 15 during the assembly process.

More specifically, in certain embodiments, where the main blade structure 15 is a thermoset component, one or more thermoplastic layer(s) may be placed onto the mold surface of the main blade structure 15. Thus, when the structure is infused, the thermoset resin will bond to the pre-cured thermoplastic layer(s). When the structure is demolded, the thermoplastic layer(s) will be on the outer surface of the thermoset structure, which provides welding surfaces on the thermoset component.

In alternative embodiments, where the blade segments 21 are constructed of a thermoplastic material, the segments 21 may be formed to contain one or more thermoset layers on a surface thereof. Such segments enable a thermoset-to-thermoset bonded connection, which can be advantageous in the event that thermoplastic-to-thermoset bonding proves undesirable.

In another embodiment, the layer(s) of composite material may be located on the inner surface of the main blade structure 15. For example, in one embodiment, a thermoset blade root section 20 may be formed with one or more thermoplastic layer(s) on an interior surface thereof. As such, the spar caps (which may be coated in a thermoplastic material) may be welded to the thermoplastic layer of the blade root section 20. In still another embodiment, a pre-fabricated thermoset component may be inserted into the thermoplastic pultrusion process such that fiberglass reinforced thermoplastic layers can be laminated onto the component. Bonding between thermoplastic and thermoset materials can be applied by a film adhesive applied between substrates. In yet another embodiment, the method 100 may include infusing a predominantly thermoset component, e.g. the spar caps, with a compatible thermoplastic infusible resin to provide a weldable surface on all sides thereof.

Referring still to FIG. 13, the step 106 of securing the blade segment(s) 21 to the main blade structure 15 may further include securing the blade segment(s) 21 to the blade root section 20, one or more of the spar cap(s) 48, 50, 51, 53, and/or the structural component 52. For example, in certain embodiments, the blade segment(s) 21, the blade root section 20, the spar cap(s) 48, 50, 51, 53, and/or the structural component 52 may be constructed, at least in part, of a thermoplastic material such that the blade segment(s) 21 can be easily welded to the blade root section 20, the spar cap(s) 48, 50, 51, 53, and/or the structural component 52.

In additional embodiments, the method 100 may further include securing the spar cap(s) 48, 50, 51, 53 to the blade root section 20 before securing the blade segment(s) 21 to the spar cap(s) 48, 50, 51, 53. Alternatively, the method 100 may include securing the blade segment(s) 21 to the spar cap(s) 48, 50, 51, 53 before securing or infusing the spar cap(s) 48, 50, 51, 53 to the blade root section 20. In still another embodiment, the method 100 may include securing the blade segment(s) 21 directly to the blade root section 20.

Referring now to FIG. 18, a flow diagram of another embodiment of a method 200 for assembling a modular rotor blade 16 according to the present disclosure is illustrated. It should be understood that the methods of assembly as described herein may be useful for any blade components such that the materials of construction can be tailored according to desired performance. Thus, the method 200 of FIG. 18 describes a method for joining any two blade components (e.g. first and second blade components 64, 66 of FIGS. 16 and 17). More specifically, as shown at 202, the method 200 includes identifying a first blade component 64 constructed, at least in part, from a first composite material. The first composite material includes at least one of a thermoset material or a thermoplastic material. As shown at 204, the method 200 includes identifying a second blade component 66 constructed, at least in part, from a second composite material. Similarly, the second composite material also includes at least one of a thermoset material or a thermoplastic material. Further, in certain embodiments, the first composite material may be different than the second composite material. Thus, as shown at 206, the method 200 may also include providing one or more layers 60, 62 of composite material at an interface 58 between the first and second blade components 64, 66. In addition, the one or more layers 60, 62 of composite material include at least one of a thermoset material or a thermoplastic material. Accordingly, as shown at 208, the method 200 may also include joining the first and second blade components 64, 66 together at the interface 58.

It should be understood that the first and second blade components 64, 66 may include any suitable blade component described herein, including but not limited to the blade root section 20, the blade tip section 22, one or more spar caps 48, 50, 51, 53, one or more shear webs 35, root inserts, blade surface features, blade extensions, one or more blade segments 21, or similar. Thus, in certain embodiments, the method 200 may also include pre-forming the first and/or second blade components 64, 66 with the one or more layers 60, 62 of composite material. More specifically, the step of pre-forming the first or second blade components 64, 66 with the one or more layers 60, 62 of composite material may include co-curing one or more layers 60, 62 with the first or second blade components 64, 66, co-infusing one or more layers 60, 62 with the first or second blade components 64, 66, mechanically fastening one or more layers 60, 62 onto the first or second blade components 64, 66, bonding one or more layers 60, 62 onto the first or second blade components 64, 66 via an adhesive, or similar.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of assembling a modular rotor blade of a wind turbine, the method comprising:
   identifying a main blade structure comprising a blade root section, the blade root section comprising a body portion that extends from a blade root of the rotor blade up to a maximum chord of the rotor blade, the blade root section comprising one or more one or more continuous spar caps extending through the blade root section and past the maximum chord of the rotor blade such that portions of the one or more continuous spar caps are exposed, the main blade structure constructed, at least in part, from a thermoset material reinforced with at least one first fiber material;
   identifying at least one blade segment, constructed at least in part, of a thermoplastic material reinforced with at least one second fiber material;
   bonding one or more thermoplastic layers at an interface between the thermoset material and the thermoplastic material via one or more mechanical fasteners; and,
   welding the thermoplastic material of the at least one blade segment to the one or more thermoplastic layers at the interface between the thermoset material of the main blade structure and the thermoplastic material of the at least one blade segment.

2. The method of claim 1, wherein the first and second fiber materials comprise at least one of glass fibers, carbon fibers, polymer fibers, ceramic fibers, nanofibers, or metal fibers.

3. The method of claim 1, further comprising securing a plurality of blade segments to the main blade structure and joining adjacent blade segments together via welding.

4. The method of claim 1, further comprising pre-forming at least a portion of the main blade structure with the thermoset material.

5. The method of claim 4, wherein pre-forming at least a portion of the main blade structure with the one or more thermoplastic layers further comprises at least one of co-curing the one or more thermoplastic layers with the thermoset main blade structure, co-infusing the one or more thermoplastic layers with the thermoset main blade structure, mechanically fastening the one or more thermoplastic layers onto the thermoset main blade structure, or bonding the one or more thermoplastic layers onto the thermoset main blade structure via at least one of an adhesive or a resin.

6. The method of claim 1, wherein the main blade structure further comprises at least one of a blade root section, a blade tip section, or one or more shear webs.

7. The method of claim 6, further comprising pre-forming the blade root section by joining a plurality of root portions of the blade root section together via welding.

8. The method of claim 6, further comprising securing the one or more continuous spar caps to the blade root section, the one or more continuous spar caps extending in a generally span-wise direction and within the at least one blade segment.

9. The method of claim 8, wherein securing the at least one blade segment to the main blade structure further comprises securing the at least one blade segment to the one or more continuous spar caps.

10. The method of claim 9, further comprising securing the one or more continuous spar caps to the blade root section before securing the at least one blade segment to the one or more continuous spar caps.

11. The method of claim 8, further comprising securing the at least one blade segment to the one or more continuous spar caps before securing the one or more continuous spar caps to the blade root section.

12. A method of assembling a modular rotor blade of a wind turbine, the method comprising:

identifying a main blade structure comprising one or more one or more continuous spar caps, the main blade structure, constructed, at least in part, of a thermoset material reinforced with at least one fiber material, the fiber material comprising at least one of glass fibers, carbon fibers, polymer fibers, ceramic fibers, nanofibers, or metal fibers; and, identifying at least one blade segment constructed, at least in part, from a thermoplastic material;

providing one or more thermoset layers at an interface between the main blade structure and the at least one blade segment; and, bonding the at least one blade segment to the main blade structure at the interface.

13. The method of claim 12, further comprising providing at least one of an adhesive or a resin between the at least one blade segment and the main blade structure before welding the at least one blade segment to the main blade structure at the interface.

14. The method of claim 12, wherein joining the at least one blade segment to the main blade structure at the interface further comprises bonding the at least one blade segment to the main blade structure at the interface via at least one of an adhesive or one or more mechanical fasteners.

* * * * *